April 16, 1929. R. E. BRESSLER ET AL 1,708,965
MACHINE FOR MIXING ROAD MAKING MATERIALS
Filed Feb. 26, 1923 7 Sheets-Sheet 3

April 16, 1929. R. E. BRESSLER ET AL 1,708,965
MACHINE FOR MIXING ROAD MAKING MATERIALS
Filed Feb. 26, 1923  7 Sheets-Sheet 5

Inventors
Robert E. Bressler
Arno F. Hirschel
by Adams & Jackson
Attorneys.

Witness
Hilton Lenoir

April 16, 1929.  R. E. BRESSLER ET AL  1,708,965
MACHINE FOR MIXING ROAD MAKING MATERIALS
Filed Feb. 26, 1923  7 Sheets-Sheet 6
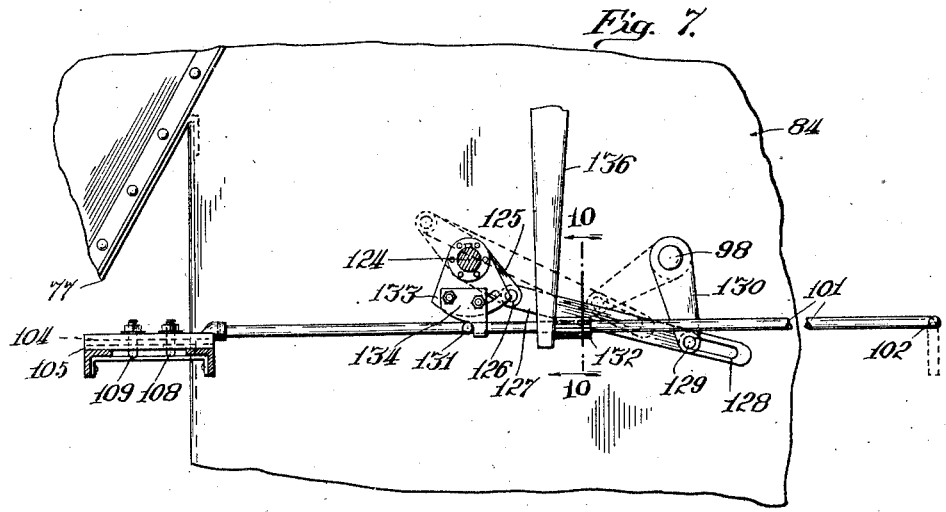
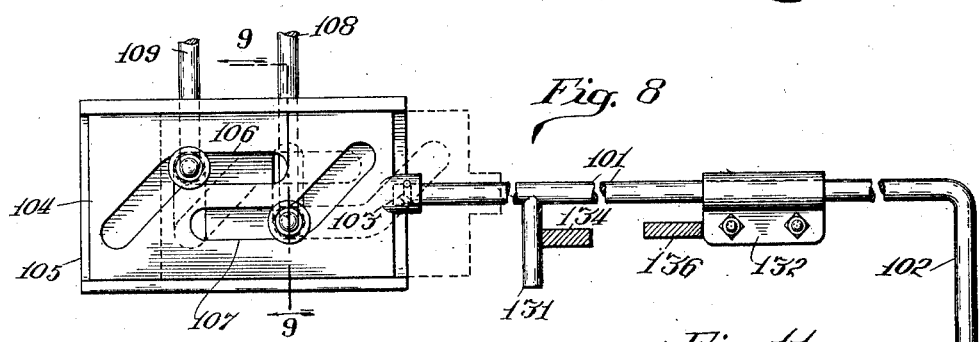
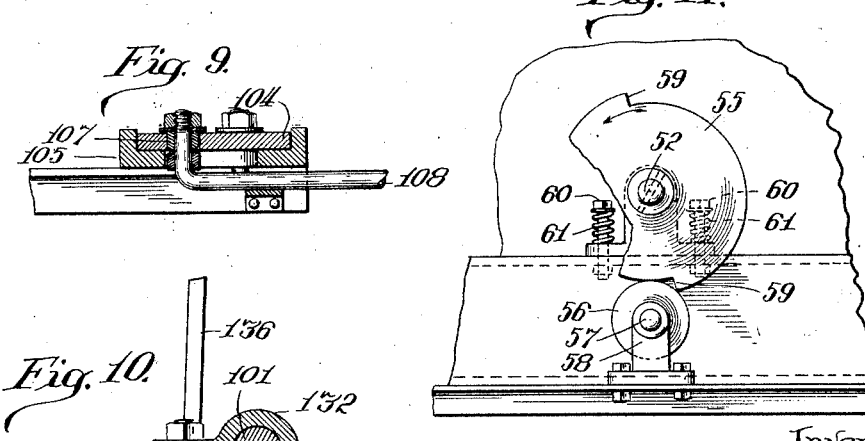

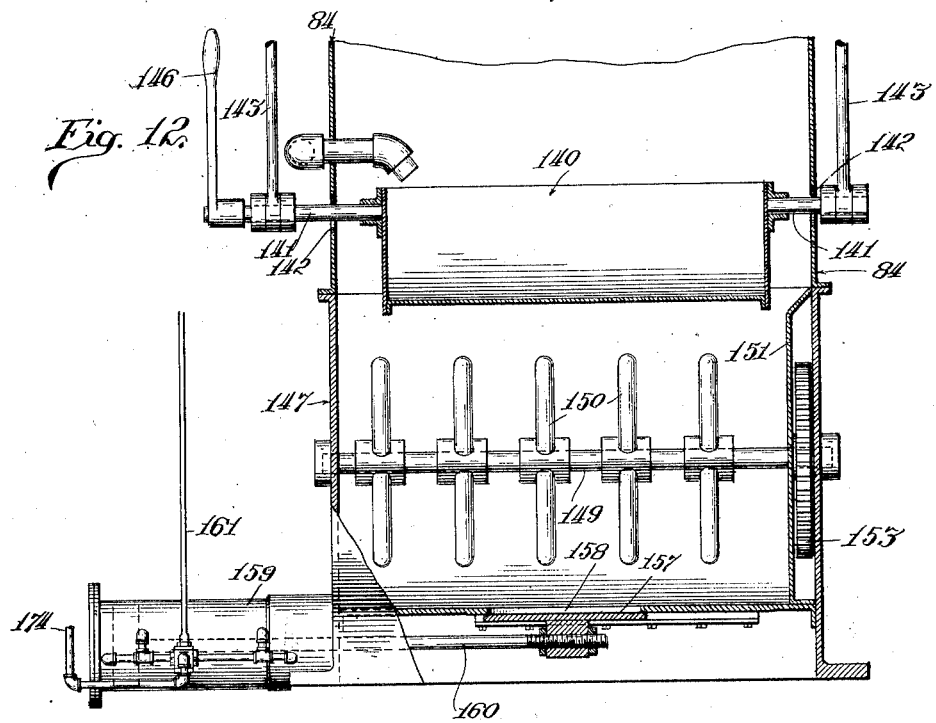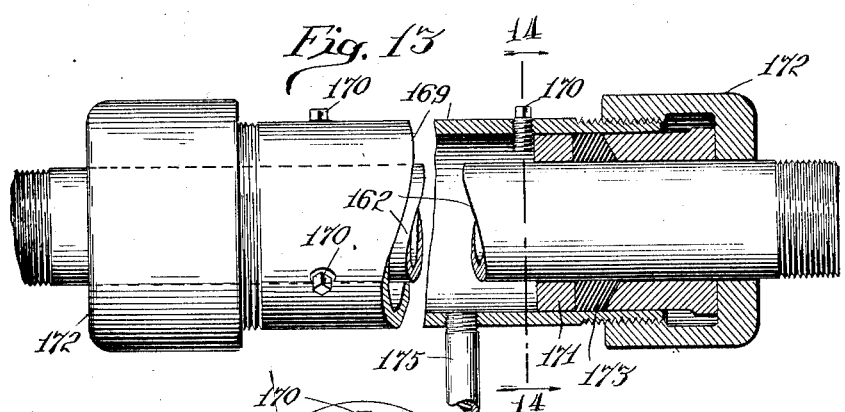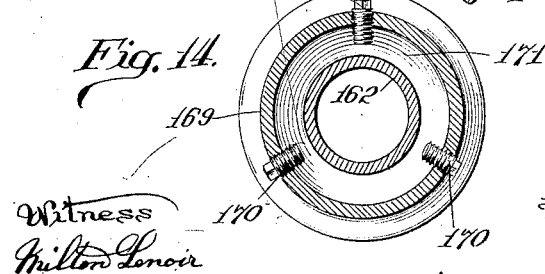

Patented Apr. 16, 1929.

1,708,965

UNITED STATES PATENT OFFICE.

ROBERT E. BRESSLER AND ARNO F. HIRSCHEL, OF AURORA, ILLINOIS, ASSIGNORS TO WESTERN WHEELED SCRAPER COMPANY, OF AURORA, ILLINOIS, A CORPORATION OF ILLINOIS.

MACHINE FOR MIXING ROAD-MAKING MATERIALS.

Application filed February 26, 1923. Serial No. 621,320.

This invention relates to improvements in machines for intimately mixing a finely-comminuted earthy material with a liquid asphalt or similar binder so as to produce a composition adapted for use in the making of roadways. In order that the best results in the making of such a roadway shall be had it is important that the earthy material and the binder element shall be properly proportioned with respect to each other and that such proportions be maintained constantly as batch after batch of the composition is prepared and used. It is the leading object of our invention to provide means whereby a predetermined proper quantity of the earthy and binder elements of each batch of the composition shall be separately measured before being intermixed. Broadly speaking, we attain this object by causing the two elements of the composition to be conducted to and enter different receptacles that are separately supported by weight-indicating devices, and after the required amount of each element, as indicated by its weight-indicating device, has been thus accumulated the two elements of the composition are delivered to a chamber where they are stirred and agitated to cause the desired thorough intermixing. Further objects of the invention are to provide improved means for handling and controlling the earthy element as it moves toward the bucket in which the various batches of such material are accumulated; and to provide improved means under the control of an attendant for causing such bucket to be operated by power to dump its load into the mixing chamber and to return to loading position. These objects we accomplish as illustrated in the drawings and hereinafter particularly described. That which we believe to be new will be pointed out in the claims.

In the drawings,—

Fig. 7 is a detail in side elevation of a portion of the means employed for operating the clutches on the drive-shaft through which the dumping movement of the bucket and the operation of the conveyor that carries material thereto are separately controlled;

Fig. 8 is a plan view of part of the devices shown in Fig. 7;

Fig. 9 is a cross-section taken on the line 9—9 of Fig. 8;

Fig. 10 is a cross-section taken on the line 10—10 of Fig. 7;

Fig. 11 is a detail, being a view in elevation of the means for agitating the rotatable screen through which the earthy material is passed, a portion of the cam member being broken away—the view being taken from the place indicated by the line 11 of Fig. 3;

Fig. 12 is a view partly in elevation and partly in vertical section, the section being taken substantially along the line 12—12 of Fig. 1;

Fig. 13 is an enlarged view partly in longitudinal section of one of the pipe sections through which the liquid binder is forced and showing also the steam-retaining means that surrounds the pipe; and Fig. 14 is a cross-sectional view taken at the line 14—14 of Fig. 13.

Figure 1:
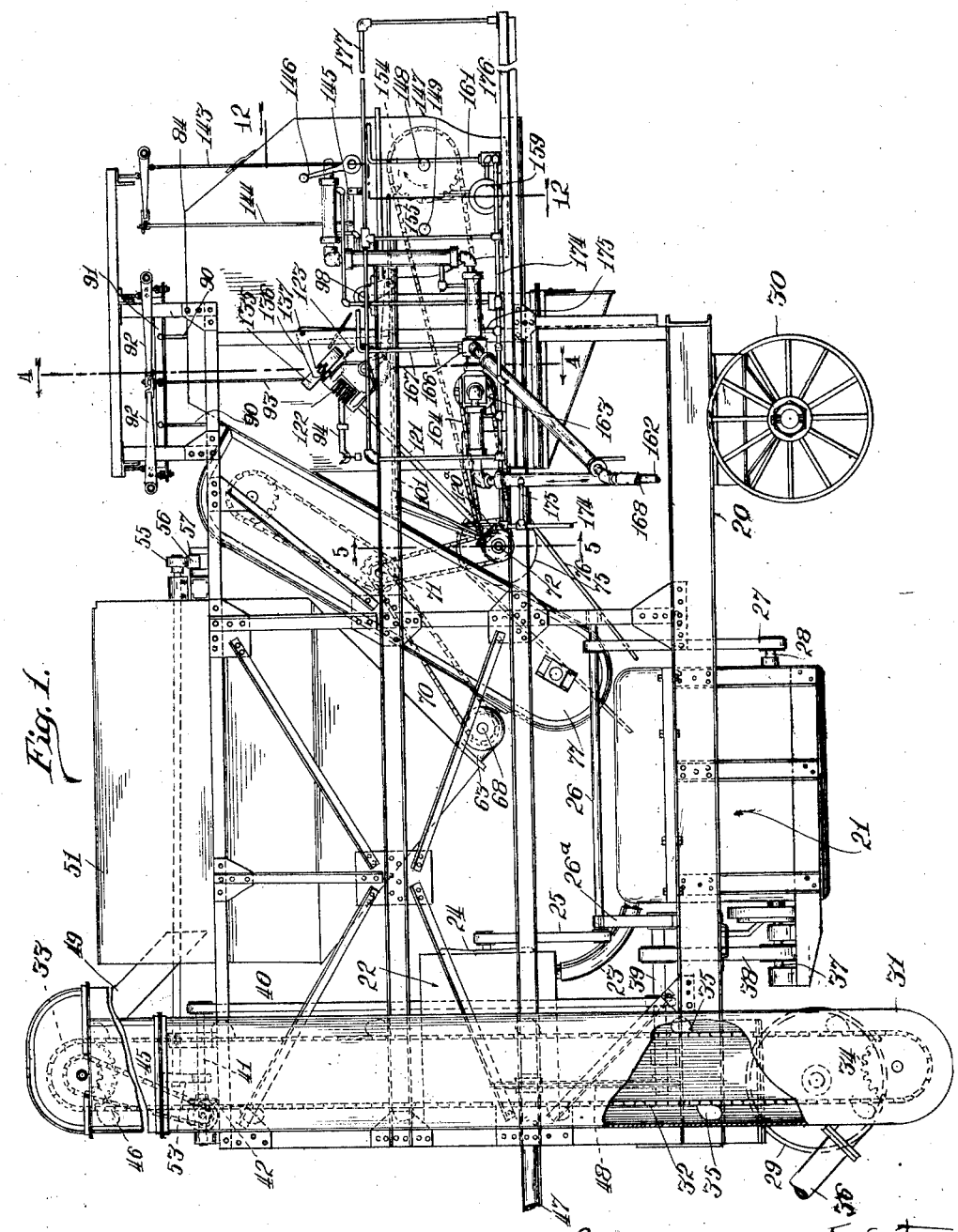
Fig. 1 is a side elevation of a machine embodying our invention.

Referring to the several figures of the drawings,—20 indicates a supporting base from which rises a heavy framework formed of a plurality of longitudinally-extending and transverse beams riveted together and braced as usual in heavy metallic structures by the usual braces, gussets and plates, all of which it is unnecessary to describe in detail, as the details of such framework may be varied from in many particulars. 21 indicates in a general way an internal combustion engine of any usual type which, as here shown, is located within the base 20 to which it is secured, said engine depending below and extending above the base. Its radiator is shown at 22 and connects with the engine by a suitable pipe 23. The radiator fan 24 is driven from the engine in the construction shown by a belt 25, a shaft 26 and another belt 27, the last-named belt running over a pulley fast on a shaft 28 that is driven by the crank shaft of the engine. The shaft 26 is journaled at one end in a bracket 26ª and at the other end in one of the upright members of the framework that rises from the base. The base 20 is preferably the frame work of a vehicle, as here shown, inasmuch as it is intended of course that the machine as a whole shall be moved along as work on the roadway that is being constructed is performed. The front wheels of the vehicle are indicated by 29 and the rear wheels by 30.

At the front end of the machine, and suitably riveted or otherwise secured to the base and the supporting framework, is a vertically-extending casing 31 in which is mounted an endless conveyor chain 32 that runs over upper and lower wheels 33 and 34, respectively, the shafts of which are journaled in the end portions of the casing 31. The conveyor chain is provided with ordinary buckets 35 for the carrying of earthy material to the top of the casing. In the construction shown such earthy material, which will have been previously preferably finely comminuted and quite highly heated, will be delivered into the lower end of the elevator casing 31 through a pipe 36 so located as to properly deliver the material into the ascending buckets 35. Preferably the other end of the pipe 36 will be connected with the delivery end of a machine that has been acting upon the material to heat it and reduce it to the desired dust-like condition.

Figure 2:
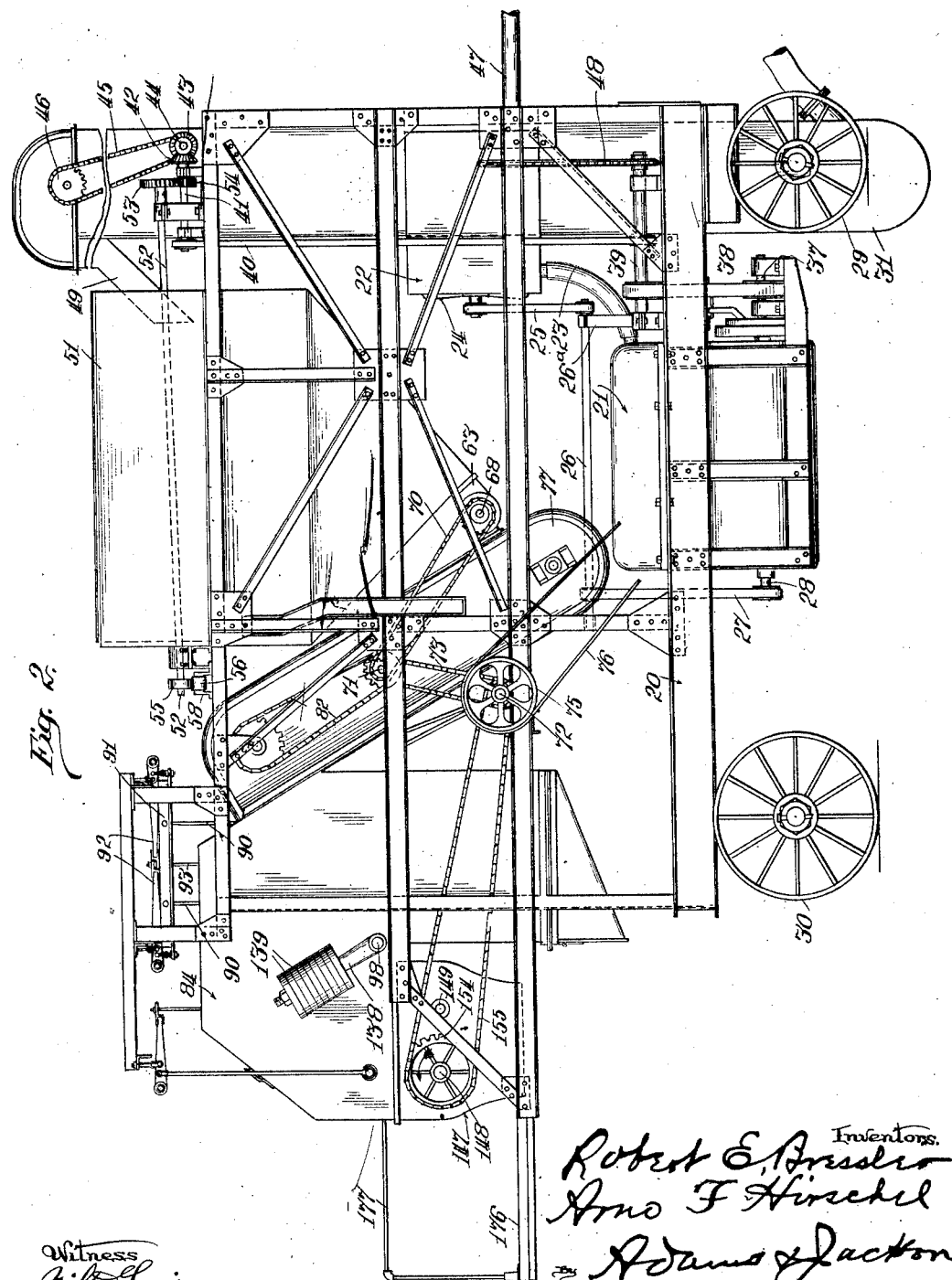
Fig. 2 is a similar view to Fig. 1 but from the opposite side of the machine.

In the construction shown the elevator conveyor chain 32 is driven from the engine by the following means: On a shaft 37 that, like the shaft 28, is connected with the crank shaft of the engine is secured a pulley over which runs a belt 38 that also runs over another pulley fast on a shaft 39. Over another pulley on said last-named shaft runs a long belt 40 that also passes over a pulley fast on the end of a short shaft 41 that (see Fig. 2), lies at one side of the elevator casing 31, such last-named shaft being journaled in brackets mounted on one of the upper members of the framework. On the other end of this shaft 41 is affixed a bevel gear 42 that meshes with another bevel gear 43 fast on a stub shaft 44 carried by the elevator frame 31 near the forward edge thereof. On this same stub shaft 44 is secured a sprocket wheel over which runs a chain 45 that also passes over a sprocket 46 on a projecting end of the shaft that carries the upper wheel 33 that the endless conveyor belt 32 passes over.

While not an essential part of this machine, there is shown in connection with it means for driving a shaft 47 which extends out from the forward end of the machine and is suitably journaled in a bearing supported by the framework, which shaft 47 is adapted to be connected with and serve as a power shaft for other mechanism that preliminarily treats the earthy material. The driving means for this shaft 47 comprise a sprocket chain 48 that runs over a sprocket made fast on an end portion of the shaft 39 and over a sprocket on said shaft 47.

The earthy material that is elevated by the buckets on the conveyor chain 32 will be delivered through a spout 49 that leads downward from the upper end of the vertical casing 31. Such spout delivers the earthy material into a rotatable screen 50 which is located in the upper end of a housing 51—the spout 49 passing through an opening in the adjacent end wall of such housing and communicating at its lower end with the interior of said rotatable screen. This screen is cylindrical in shape and its heads are secured upon a shaft 52 that passes centrally therethrough and through the end walls of the housing, suitable bearings for the end portions of the screen shaft being supported from the upper part of the supporting frame. This shaft is driven through the meshing of a gear 53 fast on the forward end of the shaft with another gear 54 carried by the short shaft 41, as clearly shown in Fig. 2. It is advisable, in order to prevent the earthy material from packing and clogging the meshes of the screen, that such screen, in addition to its rotary motion, be given a constant shaking or agitating, and to effect that the shaft 52 at its rear end has affixed thereto a cam device 55 whose edge is in contact with a roller 56 located immediately below it and supported on a pin 57 passing through the upper ends of short standards 58. As best shown in Fig. 11, this cam member 55 has its edge formed with two oppositely located shoulders 59, and from such construction it will be understood that with the cam turning as indicated by the arrow in said Fig. 11 such shoulders will cause two quick, sharp drops of the cam and its shaft at each revolution, which will result, of course, in shaking or agitating the cylindrical screen carried by the shaft. The upper portion of that bearing adjacent to the cam is held in place by two bolts 60 at each side of the shaft, around which bolts are coil springs 61 that tend to constantly hold the shaft down so that the cam member presses against its roller 56—such springs, as will be understood, being compressed when the highest points on the cam are in contact with such roller.

Figure 3:
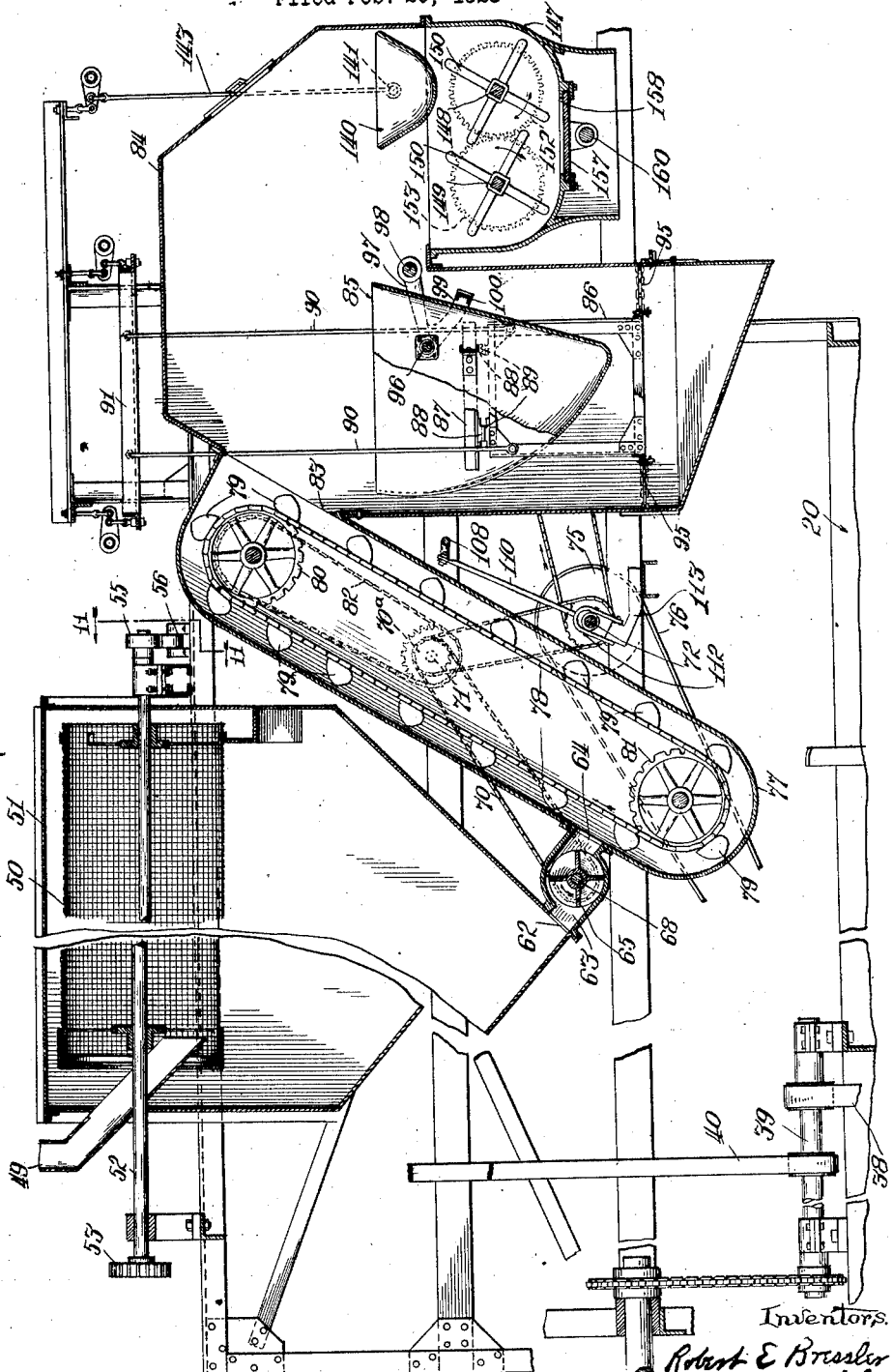
Fig. 3 is an enlarged longitudinal section through the machine, some of the parts being broken away.
Figure 5:
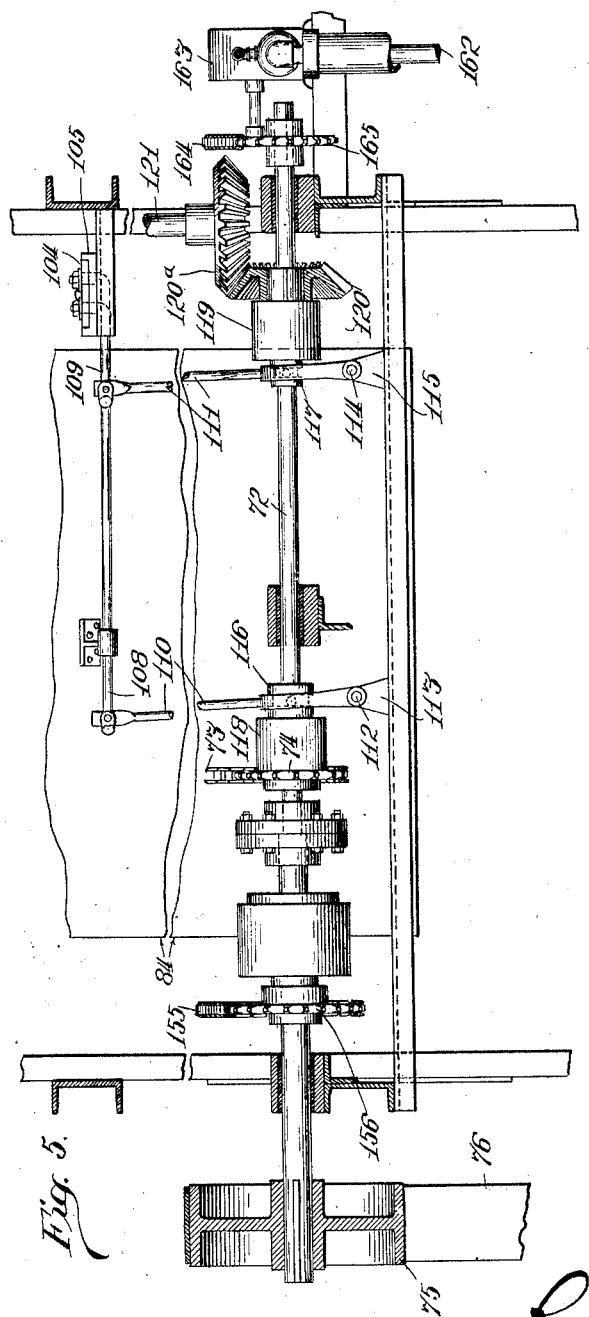
Fig. 5 is an enlarged vertical section taken approximately on the line 5—5 of Fig. 1.
Figure 6:
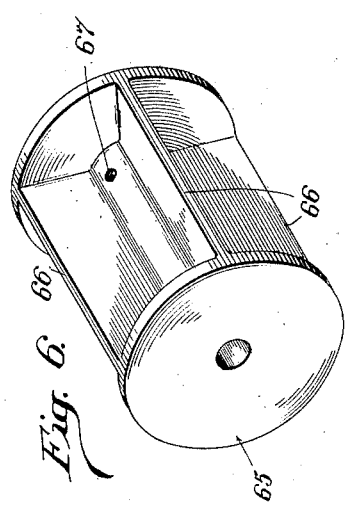
Fig. 6 is a detail, being a perspective view of the rotary valve that controls the flow of earthy material to the conveyor that carries it to the pivoted bucket in which the several batches of such material are separately accumulated.

After the earthy material passes through the rotary screen it falls of course to the bottom of the housing 51 which, as clearly shown in Fig. 3, has its side walls inclined or hopper shaped, and at the lower end of such housing in the rear wall thereof is an opening 62 with which communicates a short conduit 63 that at its other end communicates through an opening 64 with the front wall of an inclined conveyor casing. The earthy material, however, is not free to pass at all times through this conduit, but its passage is controlled by a rotary valve 65 which, as best shown in Fig. 6, is here shown as comprising two annular heads between which extend a plurality of substantially radially disposed arms 66 that form between the two heads a number of pockets to receive the earthy material as it flows into the conduit 63 and by the rotation of the valve carry such material around and discharge it through the opening 64. As shown, the walls of the conduit are curved to conform substantially to the curvature of the valve as a whole. As clearly shown in Figs. 3 and 6, this valve has a hollow hub portion to adapt it to fit upon and be secured to a shaft through which it may be rotated, the securing of it to such shaft being by any suitable means, as for example by set screws passing through openings such as that shown at 67 in Fig. 6. The shaft upon which the rotary valve is mounted is indicated by 68. It passes through the side walls of the conduit 63, and it has secured upon one of its projecting ends a sprocket 69 around which passes a sprocket drive chain 70 that also passes, as best shown in Fig. 3, around another sprocket 70ª secured upon a short transverse shaft 71 that is journaled in suitably supported bearings at one side of the conveyor casing into which earthy material from the conduit 63 is discharged. This shaft 71 also has secured upon it two other sprockets, around one of which and a sprocket fast on a shaft 72 passes a drive chain 73. The sprocket on the shaft 72 around which said chain 73 passes is clearly shown in Fig. 5 and is indicated by 74. The last-named shaft, 72, extends entirely across the machine, as clearly shown in Fig. 5, and is the shaft from which power is taken to drive or operate those parts of the mechanism lying to the rear of the hopper-bottomed housing in which is located the rotatable screen 50. This power shaft 72 is adapted to be driven from any suitable source of power through a pulley 75 fast on one of its ends and a belt 76 that passes thereover—said belt being connected up with an engine or motor not shown.

Figure 4:
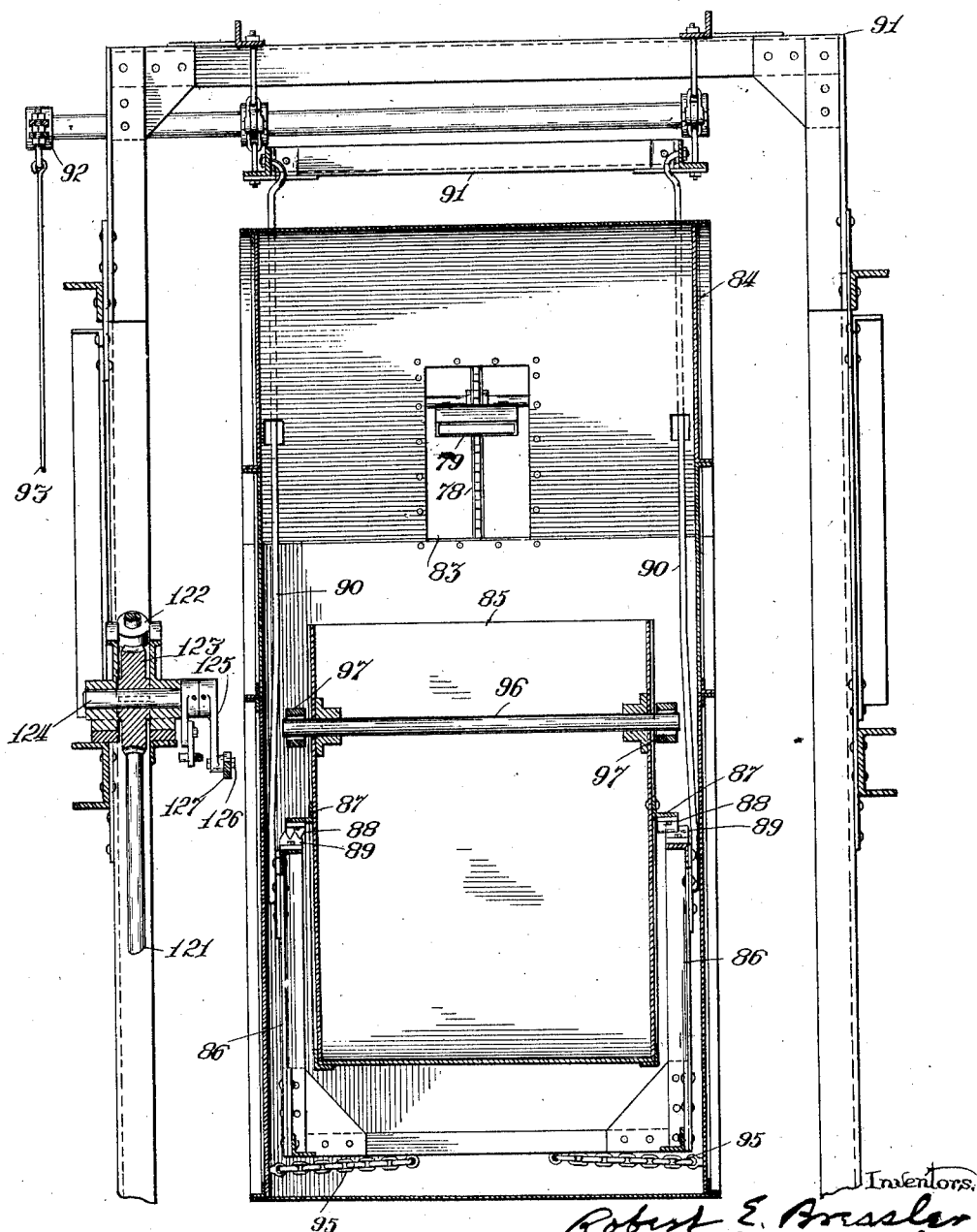
Fig. 4 is a vertical section taken approximately on the line 4—4 of Fig. 1.

The conveyor casing before referred to, into which the conduit 63 leads, is indicated by 77 and, as shown, inclines from its lower end rearwardly. Within it is located an endless conveyor chain 78 that carries at intervals buckets 79, said conveyor chain extending over upper and lower wheels 80 and 81. This endless conveyor chain is driven by means of a drive chain 82 that passes over one of the sprockets referred to on the short shaft 71 and over a sprocket on the shaft of the upper sprocket wheel 80—all as clearly indicated by the dotted line showing in Fig. 3. In the rear face of the inclined casing 77 and at the upper end thereof is an opening, as clearly shown at 83, Fig. 3, through which material carried up by the buckets 79 will be discharged. This casing is bolted to one wall of a large chamber 84 in which are located vessels that separately receive predetermined quantities of the earthy material and a liquid binder which are thereafter turned into a common mixing receptacle as hereinafter described, which mixing receptacle is also located in said chamber. The material that is discharged through the opening 83 enters this chamber 84 and falls into a receptacle in the form of a large heavy bucket 85. This bucket is located between the opposite side members of a frame 86, which is best shown in Fig. 4, and which frame is suspended from members of a weighing device that will be referred to hereinafter. To the outer face of each side wall of the bucket is riveted a bar 87, which is preferably made of a strip of angle-iron as shown, and to the under face of each of said strips is secured two bearing members 88 which rest upon another bearing member 89 secured upon the upper surface of each side member of the frame 86. Preferably these bearing members that cooperate one with the other will be grooved and tongued respectively, and also, as clearly shown, the two sets of bearings at each side will extend in opposite directions. By this means the bucket when in place on the frame will be seated and held in place very securely. This frame 86 that supports the bucket is at each side connected to the lower ends of two long rods 90 which pass through the upper wall of the chamber 84 and are pivotally connected, in the construction shown, to a metal frame 91 that is suitably connected by links to a plurality of pivoted levers 92, to the inner ends of which is suitably connected a rod 93 that depends therefrom at one side of the chamber and is pivotally connected at its lower end to an ordinary pivoted weigh-beam 94. (See Fig. 1.) As shown in Fig. 1, the parts of the weighing device that comprise the metal frame 91 and levers 92 are supported over the chamber 84 by a metal framework riveted to the upper portion of the frame that rises from the base 20. Inasmuch as the weighing devices thus briefly referred to may be of any ordinary construction and arrangement, it is not deemed necessary to describe the same here more in detail—all that is necessary to an embodiment of our invention being that any suitable weighing apparatus be employed in connection with the bucket and the frame that it rests on, and which can be set so as to show to the attendant when the predetermined amount of material has been deposited in the bucket. To allow of the necessary and comparatively slight vertical movement of the frame 86 as the bucket fills, and yet prevent at all times such frame from swinging out of its proper position, flexible connections in the form of chains 95 are provided that connect such frame with the front and rear walls of the chamber 84. The portion of the chamber below the frame is extended down and provided with an inclined floor, as clearly shown in Fig. 3, so that any material escaping past the bucket will lodge there and may be withdrawn through a door opening in one wall.

Extending through and secured in the side walls of the bucket is a heavy cylindrical bar 96, upon the projecting ends of which (see Fig. 4) are loosely journaled the ends of two heavy arms 97 that extend along the sides of and beyond the bucket and at their other ends are made fast to a rock-shaft 98 that is journaled in bearings mounted upon one of the members of the framework. Each of the arms 97 has formed with it another arm 99 that extends slightly downward and past the same face of the bucket as do the arms 97. Extending between the free ends of these arms and connected to them is a cross-bar 100. It will be evident that when the rock-shaft 98 is turned so as to cause an upward and tilting movement of the bucket, the bucket, by reason of its shape and the location of the bar 96, will tend to swing rearwardly or toward the cross-bar 100, and such cross-bar therefore, by reason of bearing against the bucket, will prevent any such swinging on its pivot 96 but will hold it in proper position as it is turned to dump its contents.

When the desired amount of earthy material has been accumulated in the bucket, as will be determined by the showing made by the movement of the scale beam 94 or equivalent scale member, the attendant will first stop the movement of the conveyor in the casing 77, so as to prevent the entrance of any more material to the bucket, and will thereafter set in motion the mechanism that causes a turning of the bucket, and this stopping of the conveying mechanism and turning of the bucket are accomplished through the following means: At one side of the machine—the side shown in Fig. 1— is located a longitudinally-movable operating rod 101, which is best shown in Fig. 8, and which, as there shown, has its rear end turned to provide a handle 102. At its other end it has a swivelling connection to a limited extent with a head 103 formed on the end of a sliding plate 104, the extent of the swivelling or turning of the rod 101 in the head 103 being limited by a pin and slot connection in the construction shown. The sliding plate 104 rests upon a base plate 105, the upturned marginal portions of which form guides for the sliding plate. Through this sliding plate are slots 106 and 107, each of said slots having portions parallel with the straight sides of the plate, and each also having a diagonal portion, said diagonal portions of the two slots extending respectively towards opposite sides of the plate. The base 105 has a wide longitudinal slot in it, as shown in Fig. 9, and up through that slot or opening and through one of the slots in the plate 104 extends the turned end of a rod. Two such rods are employed, as shown in Fig. 8, the turned end of one extending into the slot 107 and the turned end of the other into the slot 106. These rods are respectively indicated by the reference numerals 108 and 109, and the turned end of each will be preferably provided with a roller that lies in its slot in the plate and serves as an anti-friction device. A nut is screwed onto each upturned end to hold it in place, as best shown in Fig. 9. These rods extend from the sliding plate in a direction transversely of the machine, and they are pivotally connected respectively with the upper ends of arms or levers 110, 111. The lower end of the arm or lever 110 is pivotally connected (see Fig. 5) at 112 to a bracket 113 that is affixed to a transverse member of the framework adjacent to the drive shaft 72 hereinbefore referred to. The other arm or lever 111 is similarly pivoted at 114 to a bracket 115. Each of these arms or levers 110—111 is bifurcated so as to straddle and engage in the usual manner a clutch member movable along the shaft 72. The clutch member that the arm or lever 110 so engages is indicated by 116, and the clutch member which the arm or lever 111 so engages is indicated by 117. These clutch members being fast on the shaft, as usual, will cause the loose clutch members that they respectively engage to rotate with the shaft when the proper engagement of the clutch members is made, as is well understood. The loose clutch members with which the members 116 and 117 engage are indicated respectively by 118, 119. As these clutch devices may be of any ordinary construction, no detailed showing of them is here made. Connected with the clutch member 118 is the sprocket wheel 74 that, through the chain 73, causes a driving of the conveyor means in the casing 77 as before explained. It will be evident, therefore, that when the sliding plate 104 is moved so as to operate the rod 108 and arm or lever 110 as to cause a disengagement of the clutch members 116 and 118, the movement of the conveying devices that carry the earthy material up and dump it into the bucket 85 will be stopped. At the beginning of the movement of the plate 104 to effect a stoppage of the conveyor element in the inclined casing 77 the upturned end of the rod 108 will be at the outer end of the inclined portion of its slot 107, whereas the upturned end of the other rod, 109, (whose function will be explained hereinafter) will be at the extreme end of the straight portion, or that portion which is parallel with the sides of the plate, of its slot 106. A pull by the operator on the operating handle bar 101 will so move the upturned end of the rod 108 down the inclined portion of its slot as to bring it to the junction of the two legs of the slot, as shown in Fig. 8. This action necessarily draws the rod 108 longitudinally, and through the turning of the arm or lever 110 on its pivot 112 will, as will be plain from an inspection of Fig. 5, draw the clutch member out of operative relation with the other clutch member 118 and thus disconnects such latter clutch member and the sprocket wheel 74 connected therewith from the shaft and stops the movement of the elevator mechanism in the conveyor casing 77. The other rod, 109, has not been affected by the described movement of the plate, inasmuch as its upturned end simply moved along the straight portion of its slot and came to rest as shown in Fig. 8. This rod 109 is now made use of to effect a turning of the bucket 85 to cause a dumping of its contents. This is accomplished by the operator pulling upon the handle bar 101 so as to cause the upturned end of the rod 109 to be moved along through the diagonal portion of its slot 106, which of course causes an endwise pull upon such rod 109 and a rocking of the arm or lever 111 connected therewith, which rocking results in forcing into operative engagement the clutch member 117 with the clutch member 119. Connected with that clutch member 119 is a bevel gear 120 which is in constant mesh with another bevel gear 120ª that is fast on the lower end of an upwardly and rearwardly inclined shaft 121 that has secured to it near its upper end (see Fig. 1) a worm 122 that is in engagement with a worm gear 123 fast on a short shaft 124 mounted in suitable bearings on the supporting framework. As best shown in Fig. 7, there is also secured to this shaft 124 one end of a crank 125, to which is pivotally connected at 126 the forward end of a link 127 through which, adjacent to its other end, is a comparatively long slot 128 in which is movable a pin 129 that projects from the free end of a heavy crank 130 whose inner end is fast upon the rock-shaft 98 from which project the bucket-supporting arms 97. By reason of the construction described, it will be evident that upon the clutch members 117 and 119 being operatively engaged in the manner described the shaft 121 will be rotated and, through the worm 122 and gear 123, cause a rotation of the shaft 124 in the direction indicated by the arrow in Fig. 7. The turning of the shaft 124 will, through the crank 125, link 127 and crank 130, cause a turning of the rock-shaft 98, and therefore through the arms 97 that extend forward at opposite sides of the bucket and are connected with the bar 96 that passes through the bucket will raise such bucket and swing it into tilting position—the cross-bar 100 that presses against the face of the bucket preventing the bucket from swinging down as it is being raised, and therefore compelling it to properly turn into dumping position. The slot 128 in the link 127 is provided for the purpose of allowing for a slight amount of lost motion, whereby the bucket will be permitted to rest momentarily in its extreme dumping position so as to ensure all of the contents thereof being discharged therefrom. Furthermore, such slot permits the parts to assume a position whereby the bucket will be steadied and controlled as it returns to its normal or material-receiving position. As will be seen by the position of the parts as shown by dotted lines in Fig. 7, the crank 125 will have made substantially one-half a revolution at the completion of the dumping operation, and as it continues to rotate with the shaft 124 it will force rearwardly the slotted link 127 and hence cause a reverse movement of the heavy crank 130 and the shaft 98 that it is connected with, which will cause the bucket of course to be turned back and down into the position shown in Fig. 3.

It is advisable, of course, to provide for an automatic disconnecting of the bucket-operating means from connection with the main drive shaft 72 instead of relying upon the operator making such disconnection, and it is further desirable also to provide means for braking the moving parts to prevent damage that might be caused by the momentum that they were under at the time of disconnection from the drive shaft. To that end we have made the operating rod so that it has a swivel connection, as stated, with the head 103 on the plate 104, whereby such rod may be given a partial rotation—substantially a quarter turn—and have provided it with laterally-projecting devices that are adapted to co-act with other devices for effecting the two objects of disconnecting from the power shaft and applying a brake. One of these projecting devices is in the form of a short heavy finger 131, which in one rotative position of the operating rod 101 projects laterally therefrom, and the other of such devices is here shown as in the form of a plate 132 that is clamped around the rod 101 and projects in the same manner as does the finger 131. Secured upon the shaft 124 is a device adapted for cooperation with the finger 131 for effecting a movement of the parts that will disconnect the bucket-operating means from connection with the drive shaft 72. This device, in the construction shown, comprises a plate 133 that is made fast to the shaft 124 and therefore rotates with it, and it has bolted to it in an adjustable manner another plate 134, a portion of which is adapted to lie alongside of the operating rod 101 and, when such rod is turned so that the finger 131 thereon projects laterally, will come in contact with such finger. When the rod is in said position it is evident that as the shaft 124 is nearing the end of a rotation the member 134 will contact such finger and force the rod and sliding plate forward with the effect, of course, of so moving the rod 109 that the clutch members 117—119 will be separated and thus automatically stop the driving of the parts controlled therethrough. With reference to the braking that has been referred to,—there is shown on the upper end of the diagonal shaft 121 an ordinary brake mechanism comprising a disc which is made fast to said shaft and a friction band surrounding the same—such friction mechanism being indicated generally by the reference numeral 135. 136 indicates an angular lever pivoted to one of the frame members at 137, one end of which lever is connected in the usual manner to the brake band so that when said lever is turned in one direction on its pivot it will cause a tightening of that band on the brake disc. As such brake mechanism is very common, we have not deemed it necessary to illustrate it in detail. The longer arm of the bent lever 136 extends down, as shown in Fig. 7, alongside of the operating rod 101 and is adapted to be contacted by the projecting member 132 on such rod when such rod is moved inward as described, and the effect of such contacting will be, of course, to so move and turn the lever as to cause a tightening of the brake band as usual. When the operating rod is to be moved manually for the purpose of effecting either a stoppage of the conveyor mechanism in the casing 77 or starting into action the bucket-operating devices, the operator will partially rotate the rod so as to permit the projecting members 131 and 132 to pass the two depending members that they otherwise would contact with, but after each manual manipulation the operator will so turn the rod that its projecting members will be contacted when necessary to effect the automatic disconnection from the operating shaft and also setting in operation the braking means referred to.

At the opposite end of the shaft 98 from that at which the crank 130 is connected there is connected another crank member 138 upon which are suitably secured any desired number of heavy weights 139 which tend to counteract the weight of the bucket 85 and its contents, and tend to make the moving of the bucket more easy of accomplishment, as will be understood.

The receptacle into which the liquid binder element of the road-making composition is first measured out in predetermined quantities before being mixed with the earthy material is in the form of a bucket 140 located in the chamber 84 at some little distance in rear of the other bucket 85. As clearly shown in Fig. 12, there is secured to and projects from each end of the bucket 140 a trunnion 141, these trunnions extending through openings 142 in the side walls of the chamber, said openings being large enough to permit a limited amount of rising and falling movement of the bucket. This vertical movement of the bucket is had because of the fact that it, like the other bucket 85, is connected with a weighing apparatus whereby each separate charge or batch of the liquid material may be weighed in order that the predetermined quantity may be employed in connection with each predetermined amount of earthy material discharged from the bucket 85. As shown, these trunnions have pivotally connected with their outer end portions suspending rods 143 which at their upper ends are connected with any desirable construction of weighing mechanism, which may be such as that briefly referred to in connection with the earthy material bucket 85, or otherwise, the weighing apparatus here shown comprising a depending rod 144 that connects with an ordinary scale beam 145. On one of the trunnions is secured an operating handle 146 by which the operator may cause a turning of the bucket 140 to discharge its contents into the same receptacle into which the earthy material is discharged for intermixing. Such receptacle is indicated by 147 and, as shown, is located immediately below the suspended bucket 140 and slightly in rear of the other bucket 85. Journaled in the oppositely located end walls of this receptacle are two shafts 148, 149, respectively, upon each of which is secured a plurality of sets of beater or stirrer arms 150. Adjacent to one of the ends walls of the receptacle and at a little distance therefrom is another wall 151, which together with the adjacent end wall forms a narrow chamber in which, as best shown in Fig. 12, are located two intermeshing gears 152, 153, such gears being mounted respectively on the shafts 148—149. On a projecting end of the shaft 148 is secured a sprocket 154 around which passes a drive chain 155 that also passes around a sprocket 156 fast on the drive shaft 72. From the construction shown it will therefore be evident that the two sets of arms or stirrers 150 will be uniformly driven and in opposite directions, as indicated by the arrows in Fig. 3, and thus intimately intermix the solid and liquid contents that are poured into the receptacle 147 from the two buckets.

The bottom of the receptacle 147 is provided with a sliding valve 157 that normally closes a large opening 158 in the bottom of the receptacle, and such valve is actuated by power means which comprises, in the construction shown, a steam cylinder 159 in which moves a piston, to the rod 160 of which the valve 157 is connected in any ordinary manner. Through ordinary pipe connections steam is adapted to be entered at either end of the cylinder to force the piston in either direction to open or close the valve, the admission of steam being controlled by the operator through the turning of a valve rod 161 that connects with an ordinary valve.

The liquid binder material is fed to the bucket 140 through a pipe 162, the upper end section of which passes through one wall of the chamber 84, as clearly shown in Fig. 12, and terminates directly over the suspended bucket 140. The lower end of the supply pipe 162 connects with any suitable source of supply where the liquid material is kept highly heated, and it is pumped through the pipe by means of a pump which (see Fig. 1) is indicated generally by the reference numeral 163, said pump being located intermediate the ends of the pipe line. The pump is driven from the drive shaft 72 by a sprocket chain 164 that passes over a sprocket 165 on said shaft and also over a sprocket connected with the usual shaft of a pump of this character. Adjacent to the pump there is provided a valve 166 (see Fig. 1) which may be controlled by the attendant through a valve stem 167 and which will be turned to shut off the flow of the binder liquid to the bucket 140 when the weighing apparatus connected with such bucket has indicated that the predetermined amount by weight of such material entered the bucket. Upon such shutting off of the supply, the continued action of the pump will force the liquid material down through another pipe 168 that leads to the source of liquid supply. Thereafter when the bucket 140 is to receive a fresh batch of liquid material, the turning of the valve 166 will close the return pipe 168 while permitting the flow of the material up and into the said bucket.

It is highly desirable that the heavy sticky binder liquid be not allowed to materially cool during its passage from the source of supply to the receiving bucket 140, and as the ordinary covering for pipes will not by itself sufficiently prevent the loss of considerable heat, we have provided each section of the pipe line with another pipe of sufficiently greater diameter to provide a space between the two, and we have also provided means for injecting steam into such space and for preventing its escape to the atmosphere. Such a covering pipe as referred to is best shown in Fig. 13 in connection with one of the sections of the pipe line 162. The covering pipe is indicated by 169 and, as shown, adjacent to each of its ends we insert through its wall a plurality of bolts 170, preferably three in number, which project sufficiently beyond the inner face of the covering pipe to form an abutment for a ring 171 that is inserted in such covering pipe from the end thereof. The covering pipe is screw-threaded exteriorly at its ends, and screw thereupon is the head or cap 172 of a stuffing box which is adapted to compress tightly the packing that is shown at 173. Steam from any suitable source of supply is carried by a steam pipe 174, and through branches from said pipe, as shown in Fig. 1,—and one of which branches is shown in Fig. 13 and is indicated by 175—steam is admitted to the several annular chambers that are formed around each of the pipe sections 162. Such steam is, of course, effectively prevented from escaping by reason of the stuffing boxes at the ends of the sections of covering pipe, and the result is that the liquid passing through the pipe line is maintained in a highly heated condition at all times. The condensation from the steam so admitted to these covering sections will escape back through the branches and steam pipe line, inasmuch as the branches will be so located as to facilitate such discharge of the water of condensation.

The machine will be provided with a platform 176 for the operator to stand and move about upon, such platform being located at the rear of the machine and at that side where are located the devices that require manual attention from time to time. As shown, such platform will be provided with the usual guard rails 177.

The operation of the various parts having been explained in considerable detail in connection with their construction and arrangement, it is not deemed necessary to here add a description at length of the machine as a whole. It will be evident, however, that by our invention a machine is provided that ensures the delivery into a movable bucket of a batch of earthy material and into another bucket of a batch of liquid binder material, both of which batches are of a predetermined quantity, whereby upon their being intermixed in a common receptacle, as described, a composition is produced of exactly the right quality and consistency to be used effectively for the production of a good roadway surface, and, furthermore, by our invention the users of the machine are assured that the material used in the making of one part of a roadway will be of almost exactly the same character as that used upon any other part of such roadway, because of the fact that all of the various deliveries from the mixing chamber have been formed by combining equal quantities of the separate materials, and that such materials have been mixed together to the same extent and in the same manner.

What we claim as our invention and desire to secure by Letters Patent, is—

1. In a machine of the class described, the combination of a supporting frame, a shaft supported by the frame and rotating only in one direction, a tiltable bucket, conveyor means for delivering material into said bucket, and means interposed between said shaft and the bucket for causing a tilting of the bucket.

2. In a machine of the class described, the combination of a supporting frame, a rotatable shaft supported by the frame, a tiltable bucket, conveyor means for delivering material into said bucket, means connected with said shaft for controlling the operation of the conveyor means, other means also connected with the shaft for causing a tilting of said bucket, and other means under manual control for operatively engaging either of said last named means.

3. In a machine of the class described, the combination of a supporting frame, a rotatable shaft supported by the frame, a tiltable bucket, conveyor means for delivering material into said bucket, clutch-controlled means connected with said shaft for controlling the operation of the conveyor means, other clutch-controlled means also connected with the shaft for causing a tilting of said bucket, and other means under manual control for operatively engaging either of said clutch-controlled means.

4. In a machine of the class described, the combination of a supporting frame, a rotatable shaft supported by the frame, a tiltable bucket, conveyor means for delivering material into said bucket, clutch-controlled means connected with said shaft for controlling the operation of the conveyor means, other clutch-controlled means also connected with the shaft for causing a tilting of said bucket, and other means under manual control for operatively engaging either of said clutch-controlled means, said last-named means comprising a sliding plate having two angular slots therein, rods that respectively move in said slots, and pivoted clutch levers respectively connected with said rods.

5. In a machine of the class described, the combination of a supporting frame, a rotatable shaft journaled therein, a rock-shaft, arms secured to and projecting from the rock-shaft, a bucket located between and pivotally connected with said arms, means interposed between said shaft and rock-shaft for effecting a turning of the latter to cause a tilting of the bucket, and means under manual control for causing an engagement of said last-named means with said shaft.

6. In a machine of the class described, the combination of a supporting frame, a rotatable shaft journaled therein, a rock-shaft, arms secured to and projecting from the rock-shaft, a bucket located between and pivotally connected with said arms, a device connected with said arms and engaging that wall of the bucket adjacent to said rock-shaft to hold said bucket against turning with respect to said arms, means interposed between said shaft and rock-shaft for effecting a turning of the latter to cause a tilting of the bucket, and means under manual control for causing an engagement of said last-named means with said shaft.

7. In a machine of the class described, the combination of a supporting frame, a rotatable shaft journaled therein, a rock-shaft, a bucket connected with and movable about said rock-shaft as an axis, and means interposed between said shaft and said rock-shaft for compelling a turning of the rock-shaft to carry the bucket into discharging position, allowing it to remain in that position momentarily, and thereafter reversely turning the rock-shaft to move the bucket back into load-receiving position.

8. In a machine of the class described, the combination of a supporting frame, a power driven shaft journaled therein and rotating only in one direction, a rock-shaft, arms projecting from and secured to said rock-shaft, a bucket located between and pivotally connected with said arms, and means interposed between the shaft and the rock-shaft for compelling a turning of the rock-shaft first in one direction to raise and tilt the bucket to discharge its contents and thereafter in the opposite direction to return the bucket to load-receiving position.

9. In a machine of the class described, the combination of a supporting frame, a rotatable shaft journaled therein, a rock-shaft, arms projecting from and secured to said rock-shaft, a bucket located between and pivotally connected with said arms, and means interposed between the shaft and the rock-shaft for compelling a turning of the rock-shaft first in one direction to raise and tilt the bucket to discharge its contents and thereafter in the opposite direction to return the bucket to load-receiving position, said interposed means being adapted to permit an interval of inaction of the bucket between said raising and lowering movements to facilitate the complete discharge of its contents.

10. In a machine of the class described, the combination of a supporting frame, a rotatable shaft journaled therein, a rock-shaft, a bucket connected with and movable about said rock-shaft as an axis, a second rotatable shaft, means for driving said last-named shaft from said first-named shaft, a crank on said second-named rotatable shaft, a crank on said rock-shaft, and a link connecting said cranks, said link being pivotally connected with the crank on said second-named rotatable shaft and having a sliding connection with the crank on the rock-shaft, whereby said rock-shaft may be turned in one direction to carry the bucket from load-receiving position into discharging position and thereafter be turned in the opposite direction to move the bucket back into load-receiving position.

11. In a machine of the class described, the combination of a supporting frame, a rotatable shaft journaled therein, a rock-shaft, a bucket connected with and movable about said rock-shaft as an axis, clutch-controlled devices connected with said shaft for effecting a turning of the rock-shaft to swing the bucket into and out of dumping position, manually operable means for causing said devices to engage with said shaft, and other means connected with said clutch-controlled devices adapted to automatically disconnect them from operative engagement with the shaft when the bucket has been turned out of dumping position.

12. In a machine of the class described, the combination of a supporting frame, a rotatable shaft journaled therein, a rock-shaft, a bucket connected with and movable about said rock-shaft as an axis, clutch-controlled devices connected with said shaft for effecting a turning of the rock-shaft to swing the bucket into and out of dumping position, a sliding member for causing said devices to be moved into and out of operative engagement with said shaft, a handle bar connected with said sliding member by which said member may be manually moved, and means connected with said clutch-controlled devices adapted to contact said handle bar and move said sliding member to throw said clutch-controlled devices out of operative engagement with the shaft when the bucket has been turned out of dumping position.

13. In a machine of the class described, the combination of a supporting frame, a rotatable shaft journaled therein, a rock-shaft, a bucket connected with and movable about said rock shaft as an axis, clutch-controlled devices connected with said shaft for effecting a turning of the rock-shaft to swing the bucket into and out of dumping position, a movable member for causing said devices to be moved into and out of operative engagement with said shaft, a handle bar movably connected with said movable member for manually moving said member, and means connected with said clutch-controlled devices adapted in one position of said handle bar to contact said bar and move said sliding member to throw said clutch-controlled devices out of operative engagement with the shaft when the bucket has been turned out of dumping position.

14. In a machine of the class described, the combination of a supporting frame, a rotatable shaft journaled therein, a rock-shaft, a bucket connected with and movable about said rock-shaft as an axis, clutch-controlled devices connected with said shaft for effecting a turning of the rock-shaft to swing the bucket into and out of dumping position, brake means carried by a member of said clutch-controlled devices, a brake-lever, manually-operated means for causing said devices to engage with said shaft, and means connected with said manually-operated means for moving the brake-lever to apply said brake.

15. In a machine of the class described, the combination of a supporting frame, a rotatable shaft journaled therein, a rock-shaft, a bucket connected with and movable about said rock-shaft as an axis, clutch-controlled devices connected with said shaft for effecting a turning of the rock-shaft to swing the bucket into and out of dumping position, brake means carried by a member of said clutch-controlled devices, a brake-lever, manually-operable means for causing said devices to engage with said shaft, other means connected with said clutch-controlled devices adapted to automatically disconnect them from operative engagement with the shaft when the bucket has been turned out of operative engagement, and means connected with said manually-operable means for moving the brake-lever to apply said brake.

16. In a machine of the class described, the combination of a weighing apparatus, a bucket-support connected therewith, a bucket resting on said support, and power-operated means for raising the bucket off of said support and tilting it to discharge its contents.

17. In a machine of the class described, the combination of a weighing apparatus, a bucket-support suspended therefrom, a bucket resting on said support, and power-operated means for raising the bucket off of said support and tilting it to discharge its contents.

18. In a machine of the class described, the combination of a weighing apparatus, a bucket-support connected therewith, a bucket resting on said support, two arms each of which is pivotally connected at one end with the bucket, a shaft to which the other ends of the arms are attached, and power-operated means for raising the bucket off of said support and turning it around said shaft as an axis for discharging the contents of the bucket.

19. In a machine of the class described, the combination of a weighing apparatus, a bucket-supporting frame suspended from said weighing apparatus, a bucket lying within said frame, means on the outer faces of the side walls of the bucket adapted to rest upon vertical side members of the frame, and power-operated means for raising the bucket off of said support and tilting it to discharge its contents.

20. In a machine of the class described, the combination of two receptacles, means for conducting to said receptacles, respectively, solid and liquid materials, means in connection with each receptacle for indicating when a predetermined quantity of material has entered it, and power-operated means for lifting and tilting one of said receptacles for discharging its contents.

21. In a machine of the class described, the combination of two receptacles, means for conducting to said receptacles respectively, solid and liquid materials, weighing apparatus in connection with each receptacle for indicating when a predetermined quantity of material has entered the same, and power-operated means for lifting and tilting one of said receptacles for discharging its contents.

22. In a machine of the class described, the combination of a receptacle support, a receptacle resting on said support, means responsive to the pressure exerted on said support for determining the quantity of material within said receptacle, and a power-operated swinging arm operatively connected with said receptacle for raising the receptacle off of said support and tilting it to discharge its contents.

23. In a machine of the class described, the combination of a receptacle support, a receptacle resting on said support, means for indicating the quantity of material within said receptacle while the latter is resting on said support, and a power-operated arm operatively connected for raising the receptacle off of said support and tilting it to discharge its contents.

24. In a machine of the class described, a receptacle support movably mounted, a receptacle normally resting thereon, a swinging arm for tilting said receptacle to discharge its contents, and means for relatively guiding said receptacle and said support into predetermined relation when said receptacle is returned to its normal position on said support.

25. In a machine of the class described, the combination of a receptacle support movably mounted, a receptacle normally resting on said support, power-operated means for raising the receptacle off of said support and tilting it to discharge its contents, and cooperating bearing members on said receptacle and on said support adapted to guide the receptacle into predetermined position on said support in the return movement of said receptacle.

26. In a machine of the class described, the combination of a tilting receptacle movable between receiving and dumping positions, a power-operated crank member for actuating said receptacle, manual crank member for setting said power-operated means into operation, and means responsive to the movement of said crank member for automatically interrupting the power-operated movement of said receptacle.

27. In a machine of the class described, the combination of a supporting frame, a rotatable shaft journaled therein, a rock shaft, a receptacle movable between load receiving and load dumping positions by the operation of said rock shaft, and motion transmitting mechanism between said rotatable shaft and said rock shaft comprising a lost motion connection.

28. In a machine of the class described, the combination of a conveyor, power transmission mechanism for operating said conveyor, a receptacle adapted to receive material from said conveyor and arranged for dumping such material, power transmission mechanism for effecting such dumping operation, control means for controlling said power transmission mechanisms, and interlocking means for preventing simultaneous operation of both of said power transmission mechanisms.

29. In a machine of the class described, the combination of a conveyor, power transmission mechanism for operating said conveyor, a receptacle adapted to receive material from said conveyor and arranged for dumping said material, power transmission mechanism for effecting such dumping operation, clutches in each of said power transmission mechanisms, and interlocking control means for preventing simultaneous engagement of both of said clutches.

ROBERT E. BRESSLER.
ARNO F. HIRSCHEL.